US012578144B2

(12) United States Patent
De Gruiter et al.

(10) Patent No.: US 12,578,144 B2
(45) Date of Patent: Mar. 17, 2026

(54) SUPPORT ASSEMBLY IN A HEAT STORAGE DEVICE

(71) Applicants: PAUL WURTH S.A., Luxembourg (LU); PAUL WURTH DEUTSCHLAND GMBH, Wiesbaden (DE)

(72) Inventors: Christian De Gruiter, Bergem (LU); Manuel Kaufmann, Berbourg (LU); Patrick Hutmacher, Bettembourg (LU); Klaus Peter Kinzel, Luxembourg (LU); Gilles Kass, Sanem (LU); Stefan Thaler, Flörsheim (DE)

(73) Assignees: PAUL WURTH S.A., Luxembourg (LU); PAUL WURTH DEUTSCHLAND GMBH, Wiesbaden (DE)

( * ) Notice: Subject to any disclaimer, the term of this patent is extended or adjusted under 35 U.S.C. 154(b) by 287 days.

(21) Appl. No.: 18/030,827

(22) PCT Filed: Oct. 13, 2021

(86) PCT No.: PCT/EP2021/078262

§ 371 (c)(1),
(2) Date: Apr. 7, 2023

(87) PCT Pub. No.: WO2022/079080

PCT Pub. Date: Apr. 21, 2022

(65) Prior Publication Data

US 2023/0384035 A1 Nov. 30, 2023

(30) Foreign Application Priority Data

Oct. 13, 2020 (WO) ................ PCT/EP2020/078811

(51) Int. Cl.
*C21B 9/02* (2006.01)
*C21B 9/06* (2006.01)
(Continued)

(52) U.S. Cl.
CPC ................ *F27D 1/042* (2013.01); *C21B 9/06* (2013.01); *F27B 1/14* (2013.01); *F27D 1/045* (2013.01); *F28D 17/02* (2013.01)

(58) Field of Classification Search
CPC . F27D 1/04; F27D 1/045; F27D 1/042; C21B 9/00; C21B 9/02; C21B 9/06; F28D 17/02; F27B 1/14
See application file for complete search history.

(56) References Cited

U.S. PATENT DOCUMENTS 1,835,074 A 12/1931 Mckee
2,634,118 A * 4/1953 Jantsch .................. F28D 17/02 52/574

(Continued)

FOREIGN PATENT DOCUMENTS

EP 3118335 A1 * 1/2017 ............... C21B 9/04

OTHER PUBLICATIONS

International Preliminary Report on Patentability for corresponding application PCT/EP2021/078262 filed Oct. 13, 2021; Mail date Nov. 23, 2021.

(Continued)

*Primary Examiner* — Harry E Arant
(74) *Attorney, Agent, or Firm* — CANTOR COLBURN LLP

(57) ABSTRACT

A heat storage device such as a hot blast stove including a heat regeneration checkerwork made of checker bricks, the checkerwork being supported by a support assembly (16). In accordance with an aspect of the present disclosure, the support assembly having a carrier structure made of refrac-
(Continued)

tory material and carrier floor also made of refractory material, the carrier floor resting on the carrier structure and being arranged and formed to carry the checker bricks of the checkerwork.

29 Claims, 9 Drawing Sheets

(51) Int. Cl.

| | |
|---|---|
| ***F27B 1/14*** | (2006.01) |
| ***F27D 1/04*** | (2006.01) |
| ***F28D 17/02*** | (2006.01) |

(56) References Cited

U.S. PATENT DOCUMENTS 4,150,717 A * 4/1979 Balke ...................... F23L 15/02
165/DIG. 30
2008/0019982 A1 1/2008 Iliich

OTHER PUBLICATIONS

International Search Report for corresponding application PCT/EP2021/078262 filed Oct. 13, 2021; Mail date Nov. 23, 2021.
Written Opinion for corresponding application PCT/EP2021/078262 filed Oct. 13, 2021; Mail date Nov. 23, 2021.

* cited by examiner

SUPPORT ASSEMBLY IN A HEAT STORAGE DEVICE

TECHNICAL FIELD

The disclosure generally relates to a heat storage device, in particular a hot blast stove used to produce hot blast air. It relates more particularly to an improved support assembly for supporting heat regeneration checkerwork designed for use in such a heat storage device.

BACKGROUND

For the operation of a blast furnace, large quantities of hot air, also known as hot blast, are required. Cold air is preheated in large heat storage devices called hot blast stoves and is injected as hot blast air into the lower part of the blast furnace. Each blast furnace is typically provided with three hot blast stoves, although alternative arrangements are possible.

Each hot blast stove is a large regenerative heat exchanger, a typical example having a cylindrical shape topped with a dome, comprising a burner part and a regenerative heat exchanging part. The heat exchanging part usually consists of an assembly of refractory checker bricks, called a checkerwork. The shell is a welded steel cylinder, typically 6 to 10 meters in diameter and 30 to 50 meters high. The shell is designed to withstand the operating blast pressure and is insulated to minimize heat losses and to prevent structural damage to the shell caused by high thermal stresses.

The operational cycle of such a hot blast stove substantially comprises two phases: ‘on gas’ and ‘on air’.

When ‘on gas’, combustible gas, mainly blast furnace gas and coke oven gas, and combustion air are mixed and burned in the burner part of the stove and the hot flue gas is used to heat the checkerwork by leading the hot flue gas top-down through the checkerwork. The temperatures at the top of the checkerwork, the dome temperature, may be about 1400° C. The temperature of the hot flue gas decreases on its way down towards the bottom part of the checkerwork. The bottom part of the checkerwork rests on a support assembly, usually comprising a supporting grid consisting substantially of a cast iron grid which is placed upon cast iron beams resting on top of vertical cast iron columns named support columns. A cavity is thus obtained under the checkerwork. This cavity is typically about 2 to 4 m in height in conventional stoves. While conventional support assemblies have shown long lifetimes in stoves, they are limited in the temperature they can endure. Indeed, the maximum temperature of the hot flue gas at the location of such a support assembly is limited by the hot strength of the cast iron and is usually limited to about 400° C.

When this maximum temperature of the hot flue gas is reached at the location of the support assembly, the combustion and hence the flow of flue gas is stopped. In other words, the amount of heat stored in the checkerwork is limited by the maximum temperature endured by the support assembly.

The hot blast stove is now put ‘on air’. Cold blast air is now introduced into the hot blast stove through the cavity under the checkerwork and led upwardly through the hot checkerwork. As the cold blast air passes through the checkerwork, heat is transferred from the checker bricks to the cold blast air, turning the latter into hot blast air. The hot blast air is subsequently fed to the blast furnace. A quantity of cold blast air is also bypassed around the stove and is introduced into the hot blast air prior to entering the blast furnace by means of a mixer valve, to ensure that a constant hot blast air temperature is maintained prior to introduction into the blast furnace. A decrease of the outlet temperature of the hot blast air below a temperature threshold, conventionally of about 1250° C., dictates changing to another stove. The hot blast stove is then again put ‘on gas’. During normal operation of a blast furnace three stoves are used, such that at least one stove is always ‘on air’. However, it should be noted that, depending on the lay-out of the production works and the type and design of the hot blast stove, the number of stoves may also be more or less than three. It is not uncommon for example to use 2 or 4 stoves per blast furnace, or 5 stoves per two blast furnaces.

In integrated steelworks, the hot blast stoves account for 10 to 15% of the total energy requirement. It is known that the efficiency of a hot blast stove system can be improved by increasing the maximum temperature of the hot flue gas which is currently about 400° C.

US patent application US 2008199820 A1 discloses the use of a supporting assembly comprising a support grid and support columns made of metal, for instance a particular cast iron material, comprising a ferritic matrix and a dispersion of vermicular or nodular graphite particles. The use of metal in general and of this particular cast iron allows the use of a maximum temperature of the hot flue gas of about 600° C. However, cast iron can be nitrided by ammonia contained in blast furnace gas used as combustible gas when the temperature of the combustible gas is higher than 500° C., which will reduce the lifetime of this support assembly in stoves.

BRIEF SUMMARY

The disclosure provides a heat storage device, such as e.g. a hot blast stove, comprising an improved support assembly for supporting a heat regeneration checkerwork able to resist to higher temperatures and temperatures fluctuations of the hot gases as well as chemical attacks from said gases while ensuring a gas distribution in the hot blast stove as uniform as possible.

The present disclosure proposes a heat storage device, in particular a hot blast stove, comprising a support assembly and a heat regeneration checkerwork made of checker bricks, the checkerwork being supported by said support assembly. In accordance with an aspect of the present disclosure, the support assembly comprises a carrier structure made of refractory material and a carrier floor also made of refractory material, the carrier floor resting on the carrier structure and being arranged and formed to carry the checker bricks of the checkerwork.

The use of only refractory material prevents deterioration of the support assembly even at temperature as high as about 900° C. and provides said support assembly with higher resistance to nitridation or stress corrosion cracking. Hence, as the support assembly according to the disclosure does not comprise any metal support or carrier (structural) elements, such as cast iron parts, it resists to higher temperatures than conventional ones and air can be heated to higher temperatures using the hot blast stove object of the present disclosure than using conventional hot blast stoves. The expression “made of refractory material” generally referring to the carrier structure and/or the carrier floor which respectively essentially consist of refractory material, e.g. a ceramic refractory material. In other words, the carrier structure and/or the carrier floor are preferably formed of refractory material only.

As the support assembly is able to withstand higher temperatures, the heat storage device may be used for heating gases other than air; the heat storage device may e.g. be used to heat syngas. For the sake of simplicity, the present application generally discussed the heating of air. It should be noted however that other gases may be heated. Thus the term "air" may herein be substituted with "gas".

Advantageously, the refractory material used for the support assembly is a ceramic refractory material. Preferably, the refractory material is the same as the one used for the lower part of the checkerwork, such as e.g. high alumina, without being limited thereto. The use of a single material type is beneficial as it reduces the risk of failure of the support assembly in conditions wherein the checkerwork would not fail.

The carrier floor may advantageously be arranged and formed to extend, preferably gradually extend, the upper surface area of the carrier structure to cover the whole surface area of the checkerwork. By (gradually) extending the upper surface area of the carrier structure, the surface area available for supporting the checkerwork is (gradually) increased, i.e. the footprint of the support assembly is (gradually) increased.

It should be noted that the term "extend" is to be understood in the broadest way possible. The carrier floor extending the upper surface area of the carrier structure may simply mean that possible large holes inherent to the formation of the carrier structure are reduced or covered by the carrier floor and should certainly not be limited to embodiments wherein the carrier structure does not cover the whole bottom section of the hot blast stove.

According to one embodiment of the disclosure, the support structure may comprise a plurality of support columns made of refractory material. For ensuring a gas flow through most of the channels of the checker bricks forming the checkerwork, the support columns may be hollow columns, preferably presenting at least one through-opening along their radial direction for gas to flow through. In embodiments, the at least one opening may be either a circular opening or an oblong opening, and a skilled person would know how to adapt the position, the size and the aspect ratio of the opening to ensure a satisfying stability of the support column.

The inner diameter of the hollow support columns preferably corresponds to 25 to 75% of the outer diameter of these support columns, more preferably to ratio 40 to 60%, even more preferably the inner diameter is half the outer diameter.

Support columns are evenly distributed on the ground of the hot blast stove, to ensure a gas flow distribution as uniform as possible. Advantageously, and to ensure a compromise between the need for stability of the support assembly (e.g. by using larger columns) and a sufficient gas flow and gas distribution, support columns are arranged to cover between 5 and 40% of the hot blast stove ground, more advantageously between 15 and 30%, even more preferably between 20 and 25%.

According to another embodiment of the disclosure, the support structure may comprise a plurality of support arches made of refractory material. Each arch may be formed by a plurality of arch sections, preferably designed as to be assembled so that joint areas would be along radial cross sections of the global arch. Support arches may be arranged radially with respect to a middle axis of the heat storage device, or parallel to a middle axis of the heat storage device.

According to another embodiment of the disclosure, the support structure may comprise a plurality of support walls made of refractory material, preferably ceramic refractory material. The walls may be arranged in parallel as well as crosswise or hexagonally. The support structure may also comprise a plurality of transition bricks designed to advantageously extend between at least two support walls. According to one embodiment, the transition bricks may form the carrier floor. Alternatively, the transition bricks may carry the carrier floor. Either way, the transition bricks would thus (directly or indirectly) support the checker bricks above, while simultaneously improving the gas flow distribution in all channels of the checker bricks forming the checkerwork.

Advantageously, in such embodiments using support walls, the carrier floor comprises carrier bricks, which may be identical to the bricks forming the checkerwork, so that the checkerwork resting upon the carrier floor may appear as directly resting upon the support walls. In other words, in such embodiments, the carrier floor is formed by checker bricks of the checkerwork. Alternatively, the carrier bricks may be similar to the transition bricks of the support structure.

In embodiments wherein the support walls are arranged in a parallel or crosswise configuration, it may be advantageous to use rectangular or square bricks as transition bricks of the carrier structure and/or to form the carrier floor.

It should be noted that the previous embodiments may be combined, so that the carrier structure may comprise either a plurality of support columns and a plurality of support arches, or a plurality of support arches and a plurality of support walls, or a plurality of support walls and a plurality of support columns, or a plurality of support columns, a plurality of support arches and a plurality of support walls.

For even distribution of the heat carrier medium (i.e. for an even gas distribution), an annular channel may surround the support assembly.

The annular channel is preferably defined on the outside by a refractory wall protecting (i.e. insulating) the steel cylinder forming e.g. the hot blast stove. This refractory wall can carry the cylindrical shaft wall of the hot blast stove. Furthermore, the annular channel is preferably defined on the inside by either the support assembly itself (e.g. by the carrier structure), or a perforated cylindrical wall resting on the floor of the hot blast stove. Such a perforated cylindrical wall can advantageously also carry the shaft brickwork above.

The annular channel can be provided in an enlarged lower section of the steel cylinder, or integrated into the steel cylinder, possibly requiring a reduced checkerwork diameter in this section depending on the height of the annular channel. In such embodiments, above the annular channel, the checkerwork may extend in order to cover the full inner diameter of the hot blast stove.

It should be noted that the distribution of the gases is not limited to a concentric annular channel around the support assembly. It is also possible to do the distribution through one or several arches, positioned between two adjacent support walls of a row of support walls.

According to various embodiments of the present disclosure, the carrier floor may comprise at least one of the two following layers, or both layers in combination:

- a layer described as a widening structure, which may comprise widening blocks;
- a layer comprising distribution blocks and described as a distribution floor.

In the context of the present disclosure, both expressions "widening structure" and "distribution floor" should therefore be understood as referring to the carrier floor.

According to a first preferred embodiment, the carrier floor acts as a widening structure and comprises a plurality of rows of checker bricks. Successive rows of checker bricks are arranged in a staggered configuration, thereby gradually extending the upper surface area of the support columns to cover the whole surface area of the checkerwork.

Arrangements of checker bricks in such a staggered configuration may be inspired from roman brickwork. In preferred embodiments, checker bricks have the shape of hexagonal prisms and the first row of checker bricks is made so that a number of checker bricks comprised between one and twelve rest on each support column, preferably six checker bricks rest on each support column. Advantageously, each checker brick of the first row is adjacent to at least two other checker bricks of the same row. A checker brick may contact neighboring bricks with at least two successive sides, forming an assembly as compact as possible, preferably forming a triangular shape. Checker bricks forming the upper rows of the widening structure may be arranged so that each row conserves a roughly triangular shape above each support column while widening the surface area of said triangular shape at each row.

Alternatively, a checker brick may contact two neighboring bricks with two non-adjacent sides, forming an assembly with a hexagonal shape. Checker bricks forming the upper rows of the widening structure may be arranged so that each row conserves a roughly hexagonal shape above each support column while widening the surface area of said hexagonal shape at each row.

Advantageously, the checker bricks arranged in a staggered configuration to form the carrier floor being considered as a widening structure are conventional checker bricks, more preferably said checker bricks are the same as the ones used for the checkerwork. Existing checker bricks may be reused to avoid unnecessary production costs or to avoid having to manufacture complex refractory shapes.

Alternatively, some special bricks could be designed to form the carrier floor. According to a second preferred embodiment, the carrier floor comprises at least a widening block having two parallel surfaces and at least three other surfaces, generally six other surfaces. The at least three other surfaces are called lateral surfaces. A first parallel surface of said widening block defines a lower surface meant for/configured for resting on the carrier structure, preferably on the support columns, and a second parallel surface of said widening block defines an upper surface meant for/configured for supporting the checkerwork. In other words, a first parallel surface of said widening block defines a lower surface resting on the carrier structure, and a second parallel surface of said widening block defines an upper surface supporting the checkerwork.

The expression "meant for supporting the checkerwork" or "configured for supporting the checkerwork" must be understood in a broad manner, the checkerwork being placed above the widening blocks without being limited to a position in direct contact with said widening blocks.

The widening block according to the present disclosure may have the form of a hexagonal prism or a truncated hexagonal pyramid.

A widening block having the shape of a hexagonal prism may be described as a large block, a large hexagonal checker brick, or simply a larger checker brick. Such a shape of the widening block facilitates its manufacturing as well as its installation. It may be easier to extend the upper surface area of the support columns down to the inner walls of the hot blast stove.

In embodiments wherein the widening block has the form of a hexagonal truncated pyramid, the smaller of the two parallel surfaces is considered as the lower surface, and the widening block may be described as presenting an elephant foot shape.

The widening block, whatever its shape, mediates between the support column it rests upon and the load of the checkerwork directly or indirectly thrusting down upon it, broadening the area of the column's supporting surface and thus allowing for a better distribution of constraints inside the carrier floor.

Advantageously, the widening block comprises at least one inner channel, centered with respect to the upper surface of the block. In embodiments wherein the widening block comprises more than one inner channel, the channels are preferably arranged in a regular pattern, i.e. repeating pattern, whose outlets are positioned on the upper surface of the widening block. The term "regular pattern" may thus generally refer to an ordered, respectively steady, arrangement of the channels with respect to one another. For ensuring a smoother flow of gas inside the whole structure of the hot blast stove, the channels of the widening block preferably have the same diameter than the channels of the checker bricks, respectively of conventional checker bricks and their outlets are advantageously positioned to be in alignment therewith. The inner channels may be straight and perpendicular to the upper parallel surface of the widening block. Alternatively, they may be curved, presenting an outlet on the upper surface of the widening block and an inlet on one of the at least three lateral surfaces. This second embodiment may be of particular advantage when support columns are full (i.e. not hollow), to ensure a gas distribution in the channels of the checker bricks forming the checkerwork placed in a straight line above said support columns. Due to the channels ensuring the gas distribution in the channels of the checker bricks, the widening blocks may act as distribution blocks, even if their main function is to gradually extend the upper surface area of the support columns to cover the whole surface area of the checkerwork.

Advantageously, when the carrier structure comprises a plurality of hollow columns, the cross-section of the central channel of the widening block on the lower surface of said block corresponds to the inner cross section of the support columns. The cross-section of the central channel may then widen in direction of the upper surface of the widening block. Such central channel enables a more uniform distribution of the gas flow through the channels of the checker bricks resting above the widening block.

In some other embodiments, each of the at least three lateral surfaces of the widening block comprises at least one groove. Advantageously, the at least one groove is a circular groove. Preferably, when the widening block comprises at least one inner channel, the at least one groove presents a curvature radius (or diameter) equal to a curvature radius (or diameter) of the at least one inner channel. According to some embodiments, the central channel may present a bigger diameter than the other inner channels of the widening blocks. When such case arises, the at least one groove may present a curvature radius (or diameter) equal to the curvature radius (or diameter) of the smaller inner channels. In other words, dimensions of the groove formed on a lateral surface of a widening block are equal or at least similar to dimensions of an inner channel formed through the widening block. When two widening blocks are placed against one another, the at least one groove of the one block will preferably be facing the at least one groove of the other block so that at least one channel will be formed, enhancing the gas flow distribution through the carrier floor. In other words, the grooves are formed and dimensioned such that when two blocks are adjacent to each other, new additional channels will be formed between two neighboring blocks.

The widening block may be formed by a plurality of block sections, preferably designed as to be assembled so that joint areas would be along radial or longitudinal cross sections of the global widening block.

The widening block is preferably dimensioned such that a single row of widening blocks extends the support columns upper surface area to cover the whole surface area of the checkerwork. In some embodiments wherein the widening block has the shape of a hexagonal prism, i.e. the widening block is a larger checker brick, the carrier floor may comprise a plurality of rows of widening blocks arranged in quincunx, in order to increase the stability of the structure.

Alternatively, the widening block may be dimensioned such that a single row of widening blocks extends the support columns upper surface area to partially cover the surface area of the checkerwork. According to this embodiment, the carrier floor further comprises one or more rows of checker bricks to cover the whole surface area of the checkerwork.

In other embodiments, the carrier floor comprises a plurality of distribution blocks having at least three lateral surfaces, generally either four or six lateral surfaces. The distribution blocks forming a distribution floor and the carrier floor may be called a distribution floor. The distribution floor distributes gas flow between channels of the checker bricks forming the checkerwork, enhancing the uniformity of said gas flow.

The distribution blocks may have two different purposes. Advantageously, they are used either to simply feed the inner channels of the checker bricks placed upon them. Alternatively or additionally, they are used to ensure a smoother gas flow through the inner channels of the checker bricks placed upon them.

The distribution blocks may be arches presenting four lateral surfaces, or they may have the form of a hexagonal prism having two parallel surfaces and six lateral surfaces perpendicular to said parallel surfaces.

Advantageously, the distribution blocks, whatever their shape may be, comprise at least one inner channel embedded therewithin, and the at least three lateral surfaces comprises at least one circular groove, the at least one groove presenting a curvature radius equal to a curvature radius of said at least one inner channel. When two distribution blocks are placed against one another, the at least one groove of the one distribution block will advantageously be facing the at least one groove of the other distribution block so that at least one additional channel will be formed, enhancing the gas flow distribution through the carrier floor. Advantageously, the distribution blocks are positioned adjacent to each other to form a plurality of additional channels, and a continuous distribution floor.

In embodiments, distribution blocks having the form of a hexagonal prism may further comprise at least one distribution chamber, said chamber forming an opening on a lower surface of the distribution block, the at least one distribution chamber having preferentially the form of a half-sphere. The at least one distribution chamber ensures a gas flow through most of the channels of the checker bricks constituting the checkerwork placed above (directly or not) the distribution block. In some embodiments wherein the support structure consist of hollow support columns, the opening formed by the at least one distribution chamber on the lower surface of the distribution block and the inner diameter of the support columns presents the same size, and are aligned, to facilitate gas flow.

Alternatively, the at least one distribution block forming the distribution floor (or carrier floor) may have the form of an arch.

The distribution blocks according to the disclosure may be placed directly upon the support columns, support walls or support arches. Alternatively, the distribution blocks may be positioned upon a widening block. Each of the at least one distribution block may rest upon one widening block or spread between two widening blocks.

In other words, distribution floors may be of advantage with all kind of support structure, may it be support columns, support arches or support walls. These floors may consist of rectangular, polygonal, or arch bricks comprising round channels, oblong hole channels, or spherical cavities.

According to another preferred embodiment, the carrier floor comprises at least three rows of checker bricks, either directly placed on top of the support columns, or on top of widening blocks. The checker bricks are arranged to form distribution chambers above the support columns, the distribution chambers being localized between the second and the penultimate rows of checker bricks being part of the carrier floor. Such arrangement of the checker bricks enables a more uniform distribution of the gas flow through the channels of the checker bricks forming the checkerwork, in particular in the areas above the support columns, where the inlet to one or more channels may otherwise be blocked by the support column itself.

According to another aspect, the present disclosure proposes a method for producing hot blast air or hot syngas, i.e. heating, cold blast air or cold syngas, using a hot blast stove comprising a support assembly as described above for supporting the heat regeneration checkerwork made of checker bricks as a regenerative heat exchanger using operational two phase cycle alternating 'on air' and 'on gas' phases as further explained in the background section above. When in operation, blast air or syngas may be conducted into the hot blast stove, whereby heat is transmitted from the checkerwork to the blast air or syngas. The advantages and further embodiments outlined for the (hot) blast stove apply analogously to the method.

BRIEF DESCRIPTION OF THE DRAWINGS

Further details and advantages of the present disclosure will be apparent from the following detailed description of not limiting embodiments with reference to the attached drawing, wherein.

DETAILED DESCRIPTION

Figure 1:
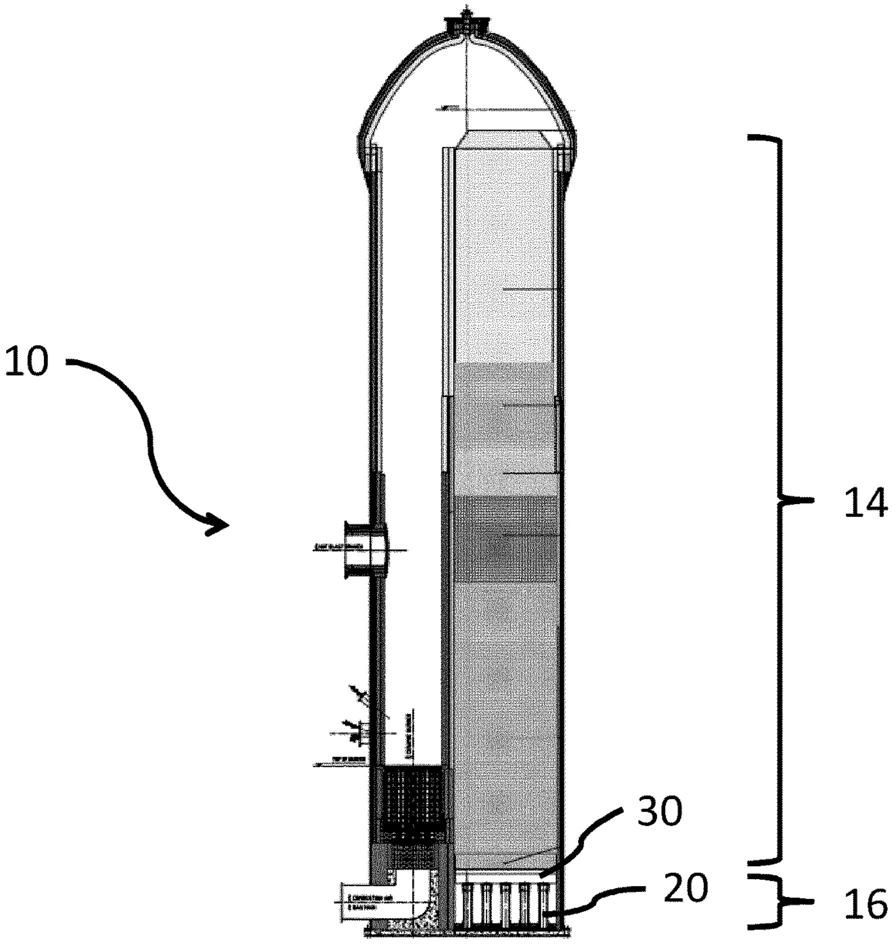
FIG. 1 is a schematic view of a blast stove for carrying out an embodiment of the inventive support assembly.

A hot blast stove 10, as represented in FIG. 1, comprises a heat exchanging part consisting of an assembly of refractory checker bricks 12 called a checkerwork 14 and a support assembly 16 on top of which the checkerwork 14 rests.

Figure 2:
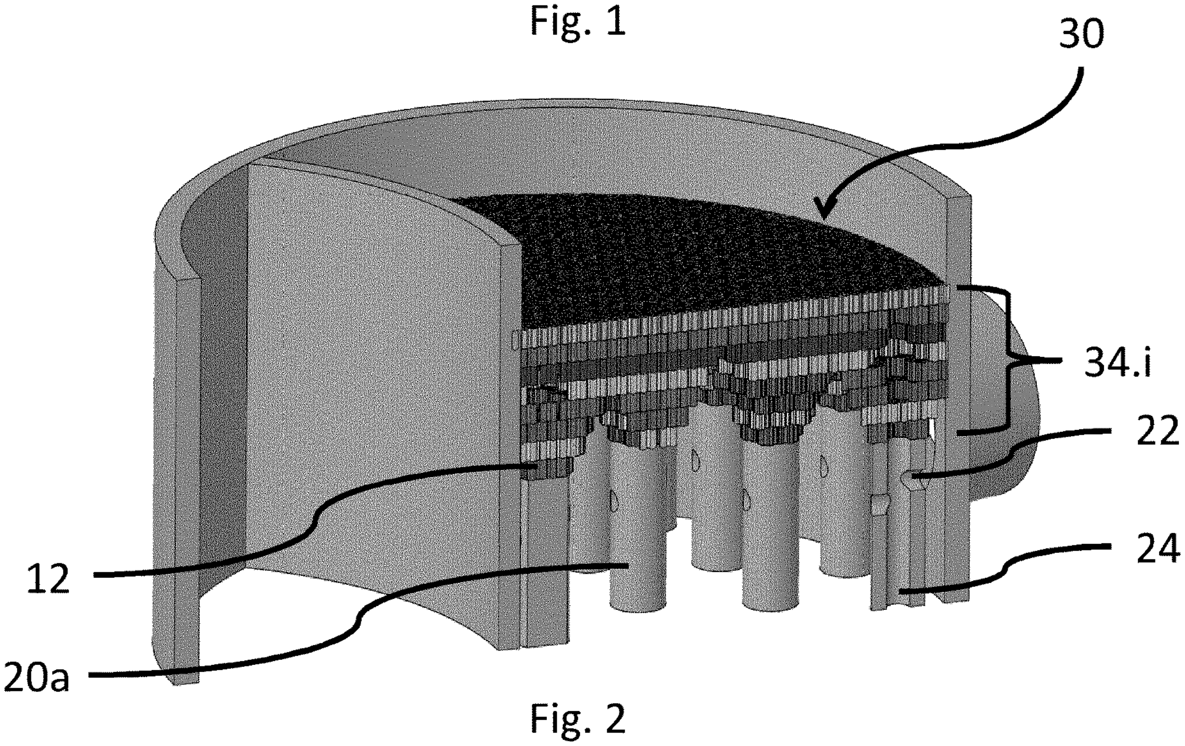
FIG. 2 is a schematic view of a first preferred embodiment of the inventive support assembly.

FIG. 2 shows a detailed view of the support assembly 16 according to a first embodiment of the disclosure. The support assembly 16 is entirely made of refractory material and consists of a carrier structure 20 and carrier floor resting on the carrier structure 20. According to the present embodiment presented FIG. 2-FIG. 4, the carrier floor is a widening structure 30. The carrier structure 20 comprises a plurality of support columns 20*a*. The widening structure 30 is arranged and formed to gradually extend an upper surface area 26 of the support structure 20 to cover the whole surface area of the checkerwork 14.

The support columns 20*a* have the shape of hollow cylinders, forming an inner channel 24 therein. In two particularly preferred embodiments, the diameter of the inner channel 24 of the columns corresponds to either 44% or 50% of the outer diameter of the hollow cylinder. The support columns 20*a* further present a through-opening 22 along their radial direction, for gas to flow through. It enables gas flow to circulate inside the inner channel 24 of the columns and be distributed inside the channels 32 of the checker bricks 12 forming the checkerwork 14 placed above the upper surface of the support columns 20*a*.

Figure 3:
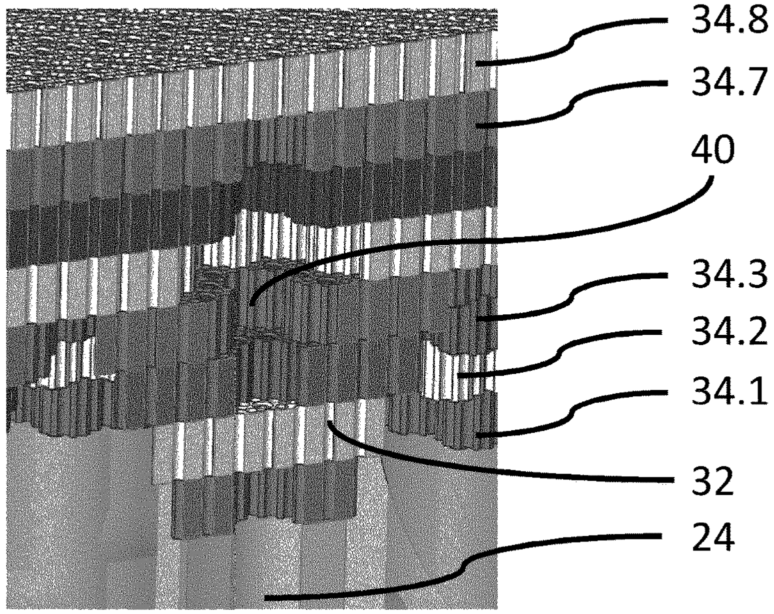
FIG. 3 is a schematic view of a distribution chamber of the support assembly according to the first preferred embodiment.

In one first preferred embodiment, as seen in FIG. 2-3, twenty-two support columns 20*a* having an inner diameter of 220 mm and an outer diameter of 500 mm are evenly arranged on the ground of the hot blast stove 10. Each support column further presents a circular through-opening 22 positioned so as not to weaken the support assembly. In the illustrated example, the widening structure (i.e. carrier floor) consists of eight rows of conventional checker bricks 34.1-34.8, i.e. the checker bricks forming the widening structure are of the same type as the checker bricks forming the checkerwork. In other words, only one kind of bricks is used in such a preferred embodiment. The number of checker bricks per row 34.*i* and percentage of checkerwork surface coverage are presented in Table 1, but any skilled person would know how to adapt these values to any hot blast stove.

TABLE 1

| Row | Number of checker bricks | Checkerwork surface coverage |
|---|---|---|
| 1 | 132 | 15% |
| 2 | 264 | 31% |
| 3 | 396 | 46% |
| 4 | 516 | 61% |
| 5 | 624 | 73% |
| 6 | 743 | 87% |
| 7 | 821 | 96% |
| 8 | 851 | 100% |

Figure 4A:
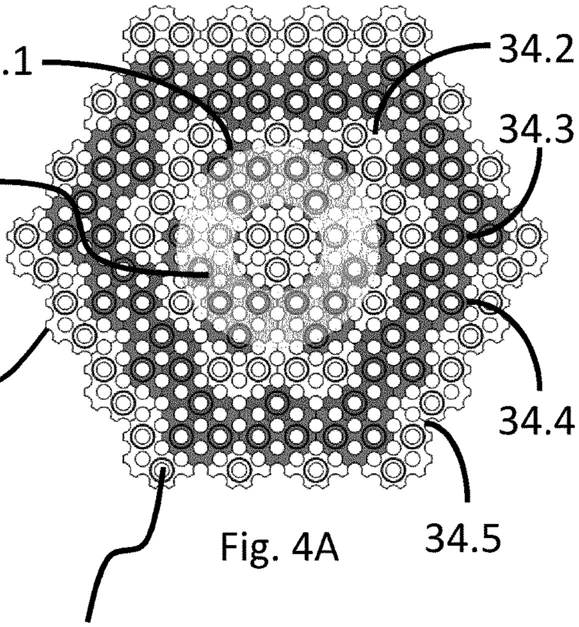
FIG. 4A is a schematic view of a first version of a checker bricks arrangement on top of support columns according to the first preferred embodiment of the inventive support assembly.

The checker bricks 12 forming the first row are evenly distributed on top of each support column, so that six checker bricks 12 rest on top of each support column. As illustrated in FIG. 4A, these six checker bricks 12 are arranged to form a hollow hexagonal prism, each brick contacting neighboring bricks by two non-adjacent sides. Checker bricks 12 forming the upper rows are arranged following the same pattern, thereby gradually extending the upper surface area 26 of the carrier structure to cover the whole surface area of the checkerwork 14. Furthermore, checker bricks 12 are arranged so that gas distribution chambers 40 are formed above the support columns 20*a*, extending between the 3$^{rd}$ row 34.3 and the 7$^{th}$ row 34.7. The purpose of such a chamber is to redistribute the gas into the channels covered by the column and in particular in the channels that were completely obstructed, such as e.g. channels 32.

Figure 4B:
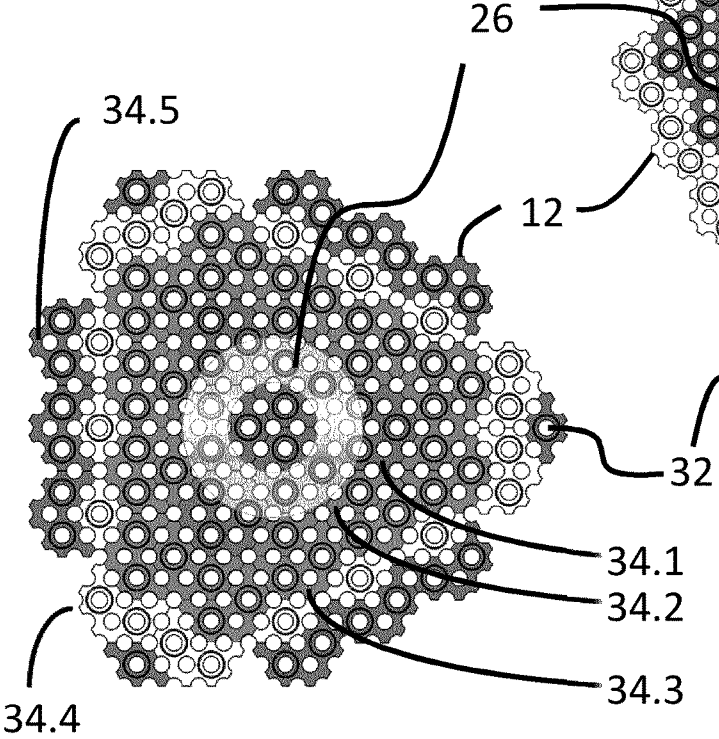
FIG. 4B is a schematic view of a second version of a checker bricks arrangement on top of support columns according to the first preferred embodiment of the inventive support assembly.

Alternatively, in another version of the first preferred embodiment, thirty-one support columns 20*a* having an inner diameter of 200 mm and an outer diameter of 400 mm are evenly arranged on the ground of the hot blast stove 10. Each support column further presents a through-opening 22 positioned so as not to weaken the support assembly and the widening structure 30 consists of rows of conventional checker bricks 34.*i*. The first row 34.1 is formed by 186 checker bricks arranged so that six bricks rest on top of each support columns. As illustrated in FIG. 4B, these six checker bricks 12 are arranged to form a roughly triangular shape. Checker bricks of the second row 34.2 are arranged on top of the first row 34.1 in order to expand the surface coverage of the first row of checker bricks 34.1 while maintaining a roughly triangular shape of the checker bricks arrangement above the support column. Checker bricks 12 forming the upper rows are arranged following the same pattern until the surface coverage of the uppermost row corresponds to 100% of the checkerwork surface area. Furthermore, checker bricks 12 are arranged so that gas distribution chambers 40 are formed above the support columns 20*a*, extending between the 4th row 34.4 and the 5th row 34.5, with a maximal width corresponding to the outer diameter of the support columns.

Figure 5:
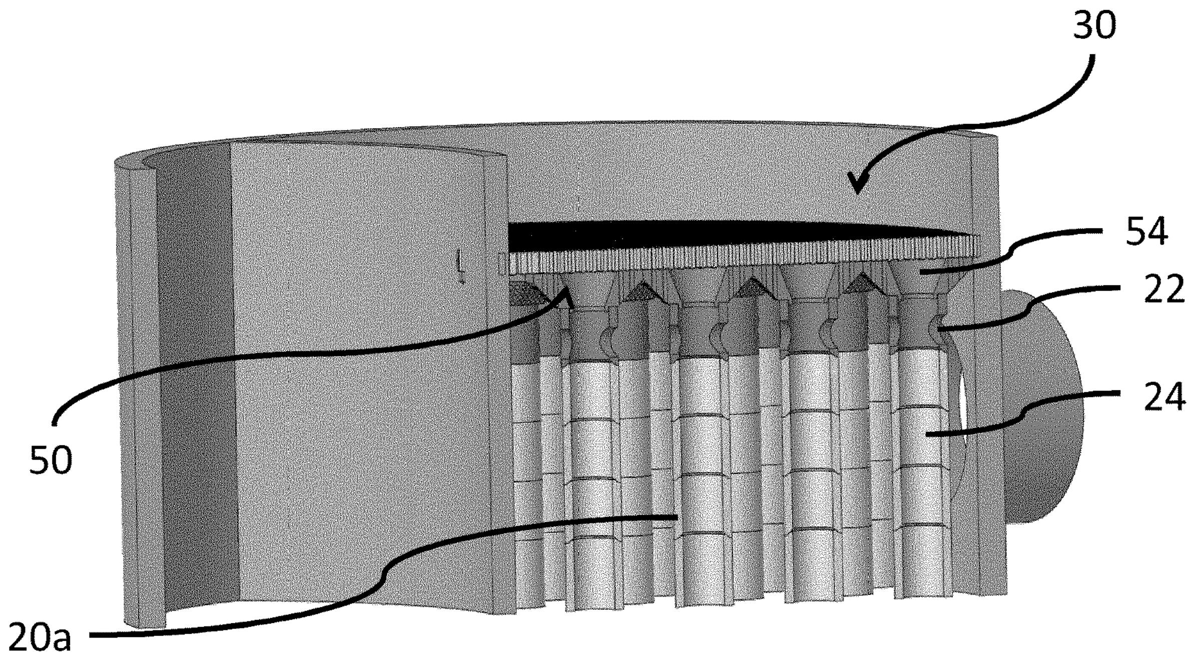
FIG. 5 is a schematic view of a second preferred embodiment of the inventive support assembly.

FIG. 5 shows a detailed view of the support assembly 16 according to a second embodiment of the disclosure. In this embodiment, thirty-five support columns 20*a* having an inner diameter of 250 mm and an outer diameter of 500 mm are evenly arranged on the ground of the hot blast stove 10. Each support column further presents a through-opening 22 positioned so as not to weaken the support assembly and the widening structure 30 consists of widening blocks 50.

Figure 6:
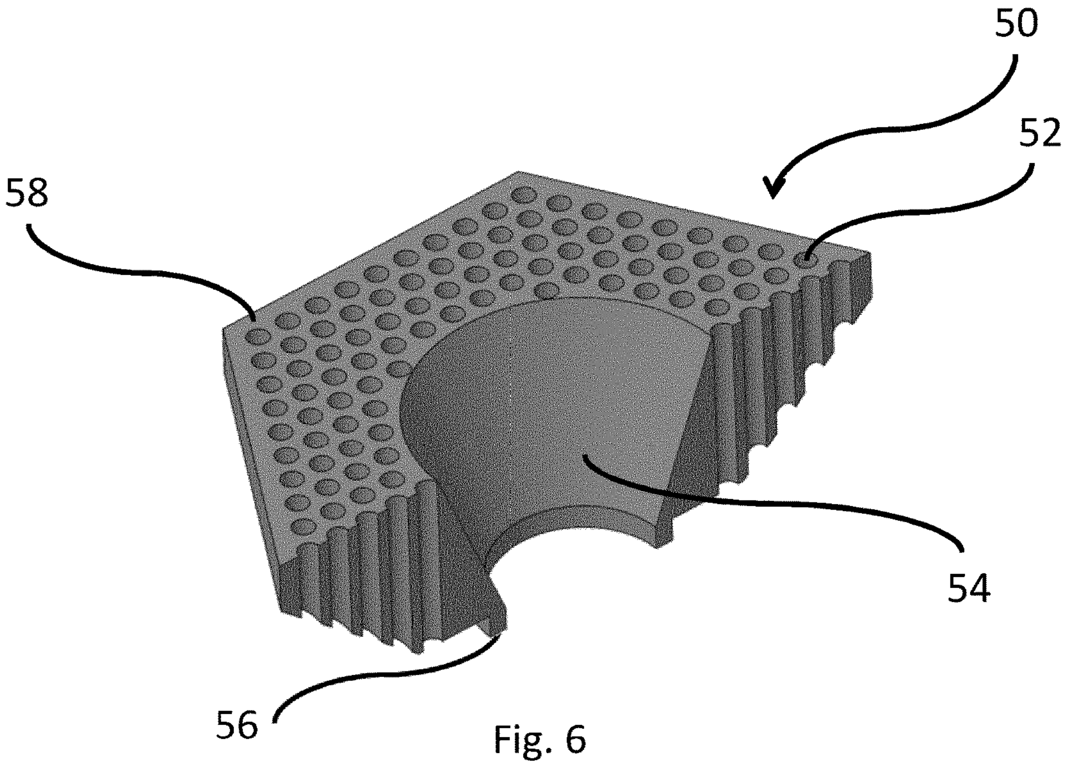
FIG. 6 is a schematic sectional view of a first embodiment of a widening block according to the disclosure.
Figure 7:
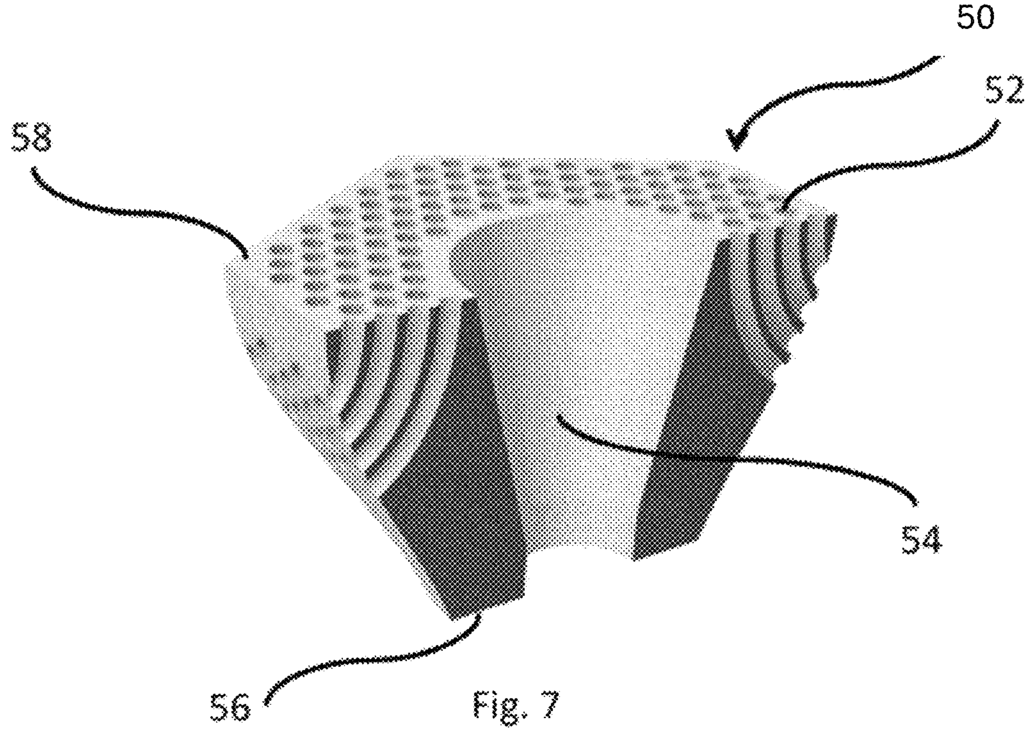
FIG. 7 is a schematic sectional view of a second embodiment of a widening block according to the disclosure.

A widening block 50, as seen in FIG. 6 or FIG. 7, may have the form of a truncated hexagonal pyramid with two parallel surfaces 56-58 and inner channels 52 arranged in a regular pattern. The inner channels may be straight (FIG. 6) or curved (FIG. 7) with regard to the upper of the two parallel surfaces. The widening block rests on top of a support column 20*a* by its smaller and lower parallel surface 56, while the upper and larger parallel surface 58 is configured for supporting the checkerwork 14. Widening blocks 50 are dimensioned such that a single row of widening blocks extends the upper surface area 26 of the carrier structure to cover the whole surface area of the checkerwork 14. In order to ensure a smoother flow of gas inside the whole structure of the hot blast stove 10, the inner channels 52 of the widening block 50 preferably have the same diameter than the channels 32 of the conventional checker bricks 12 forming the checkerwork 14 and their outlets are positioned on the upper surface 58 to be in alignment therewith. The widening block 50 further comprises a central channel 54 having on the lower surface 56 a cross section corresponding to the diameter of the support columns inner channel 22, and a larger cross section on the upper surface 58.

Figure 8:
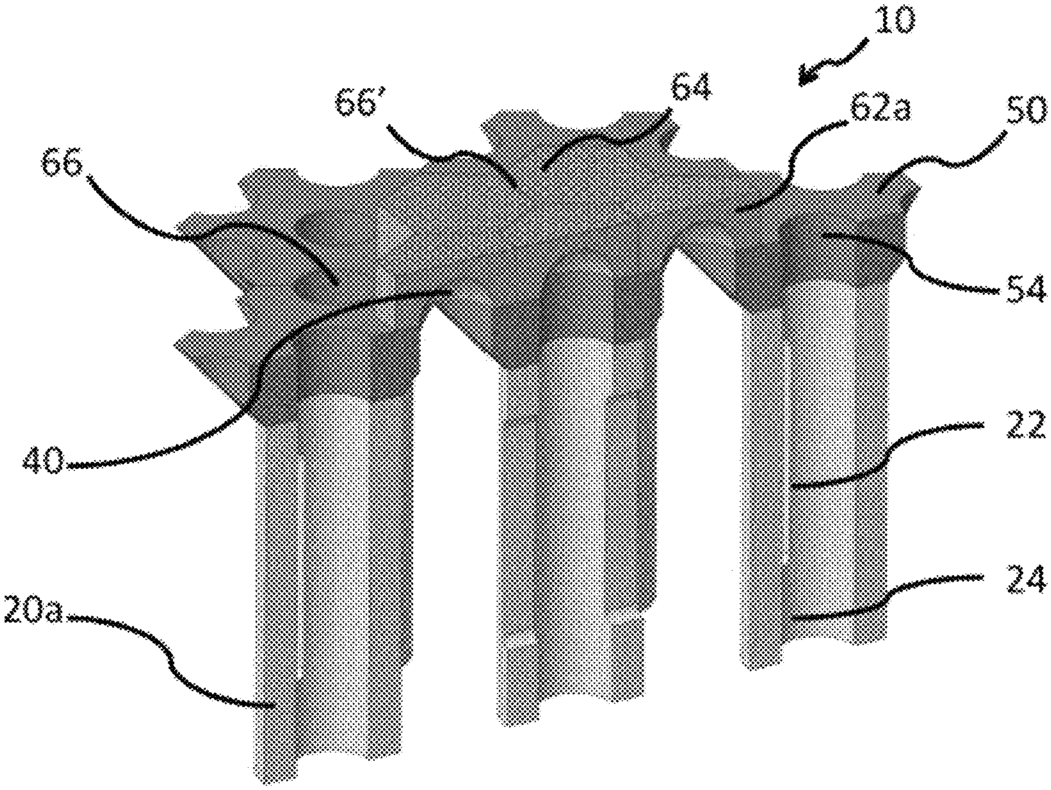
FIG. 8 is a schematic view of a third preferred embodiment of the inventive support assembly.

Other possible embodiments of widening blocks 50 may be used by those skilled in the art. In particular, widening blocks 50 may present only one inner channel, preferably described as central channel 54, as represented on FIG. 8. The central channel presents the same diameter than the inner channel 24 of the support columns to ensure a smooth gas flow for gas penetrating inside said support columns 20 through a slot opening 22 on their side. The lateral surfaces of the truncated hexagonal pyramid present a circular groove, with a curvature radius (or diameter) equals to the curvature radius (or diameter) of the central channel. When widening blocks 50 are dimensioned so that a single row of widening blocks is sufficient to cover the whole surface of the above checkerwork 14 (such as represented in embodiments of FIG. 8 or FIG. 9), the widening blocks contact each other. The circular groove on one lateral surface of a first widening block thus faces the circular groove on one lateral surface of a second widening block. The two grooves when assembled will delimit a channel, called a contact channel 66 as it is form by the contact of two blocks. The contact channels 66 actively participate in the uniform gas flow distribution inside the channels of checker bricks placed above, the checker bricks being part of the carrier floor or of the checkerwork. The widening blocks 50, arranged in abutment with each other, are building a single floor for which the flatness is easier to adjust than for separated pillars.

Furthermore, distribution blocks 62 may be arranged on top of the widening blocks 50 to form a distribution floor 60. The distribution floor is to be considered a part of the carrier floor just as the widening structure formed by the widening blocks. Each of the widening structure 30 and the distribution floor 60 should be considered as a layer of the carrier floor.

The distribution blocks 62 can be hexagonal prism (as in FIG. 8) or arches (as in FIG. 9) made of refractory material. The main purpose of the distribution blocks is to ensure a smoother and more uniform flow of gas inside the whole structure of the hot blast stove 10, so that distribution blocks 62 may be called smoothing distribution blocks 62*a*. In the particular embodiments of FIG. 8 and FIG. 9, the distribution blocks 62*a* present inner channels 64. In preferred embodiments, channels 64 of the distribution blocks 62*a* are curved, thus ensuring a gas distribution to all channels of the checkerwork placed upon. Lateral surfaces of the distribution blocks 62*a* present a regular arrangement of circular grooves, so that when two distribution blocks are positioned against each other, new and additional distribution channels are formed for gas to flow through. These channels between two distribution blocks can be described as contact channels 66' as they are formed by two distribution blocks adjacent to each other.

Figure 9:
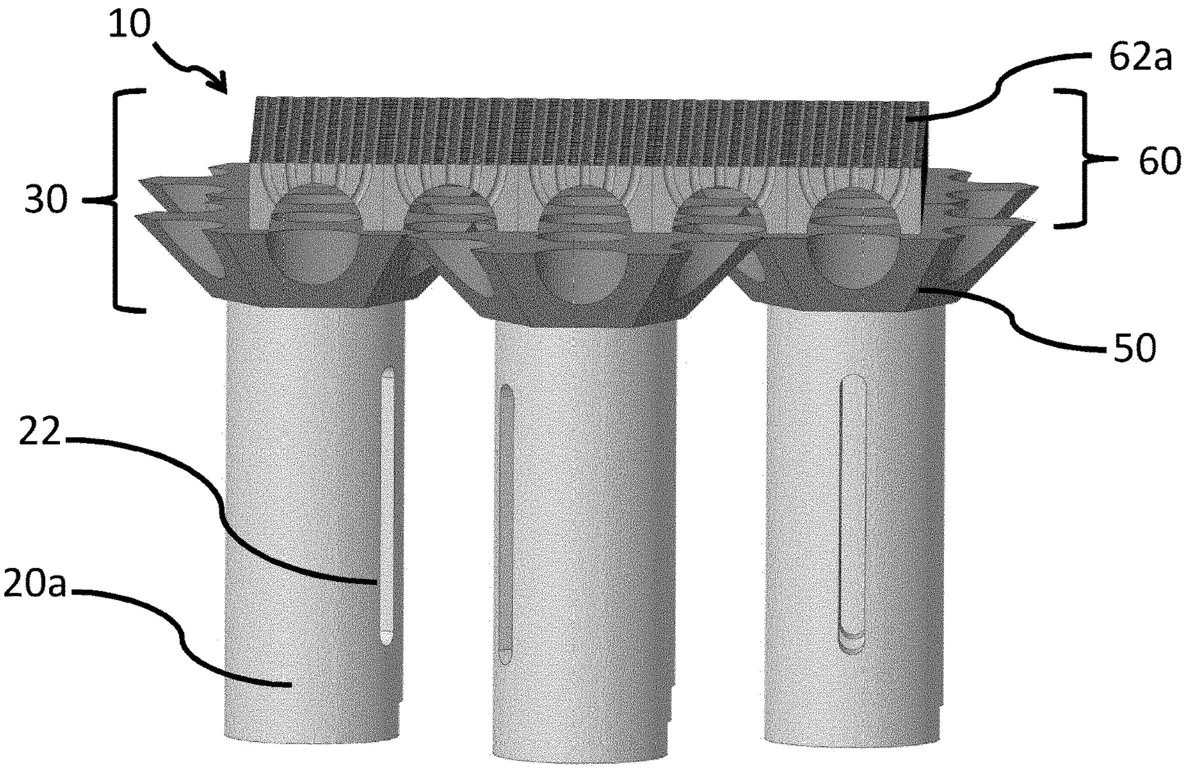
FIG. 9 is a schematic view of a fourth preferred embodiment of the inventive support assembly.
Figure 10:
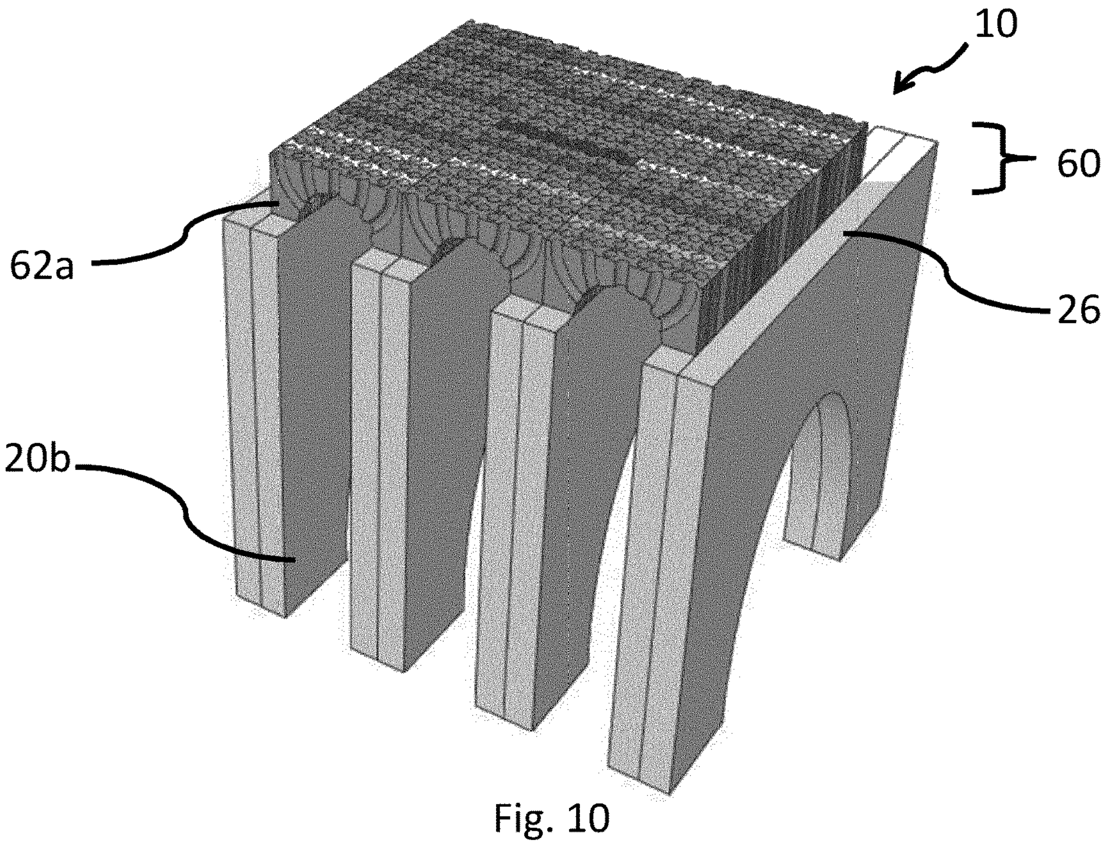
FIG. 10 is a schematic view of a fifth preferred embodiment of the inventive support assembly.

Alternatively to what is described on FIG. 9, the carrier structure 20 may comprise a plurality of arches 20*b* instead of hollow columns 20*a*. The arches could be described as support arches. In this preferred embodiment, the distribution floor 60 is positioned directly above said support arches (see FIG. 10). The distribution blocks 62*a* are dimensioned so as to spread between two support arches, thus extending the upper surface area 26 of the carrier structure.

Figure 11:
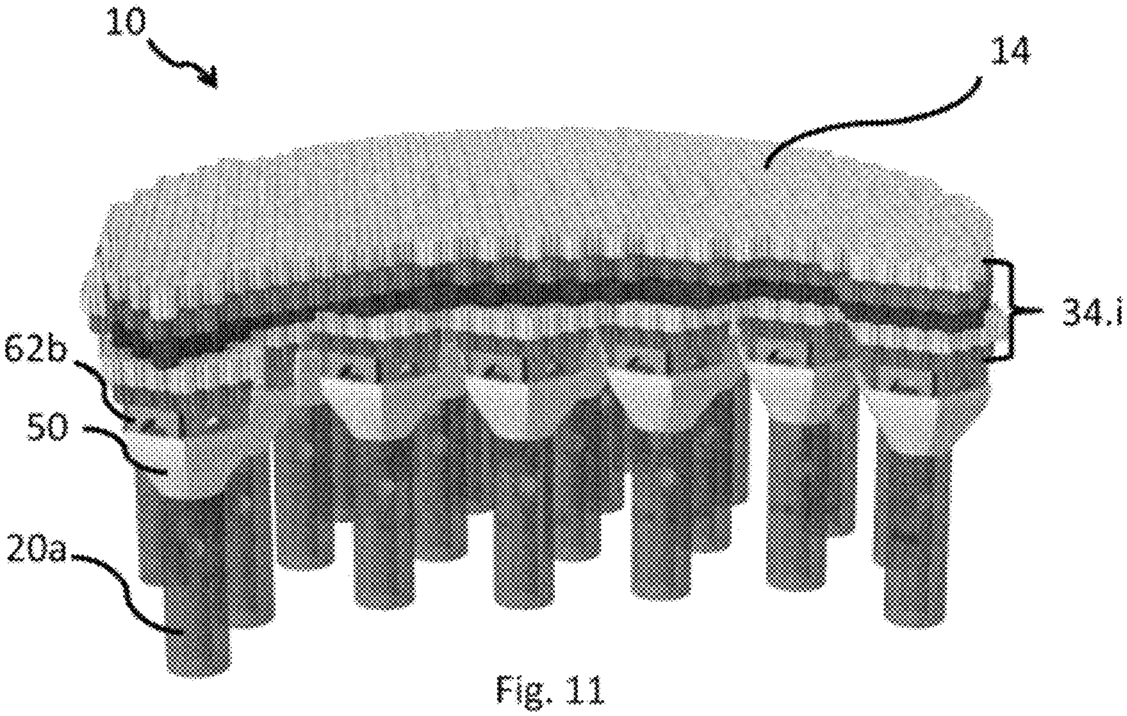
FIG. 11 is a schematic view of a sixth preferred embodiment of the inventive support assembly.

Another preferred embodiment of the support assembly according to the disclosure is presented on FIG. 11. Support columns 20*a* are hollow columns presenting a through opening 22 for gas to flow through, but they could as well be full columns, i.e. not hollow. Widening blocks 50 are positioned upon the support columns 20*a* but without contact between said blocks, so that gas can flow between them. In this particular embodiment, the widening blocks 50 are full, i.e. they do not present any channels. It is therefore necessary to ensure a gas distribution through the inner channels 32 of the checker bricks placed above said widening blocks, so that distribution blocks 62*b* are employed. The main goal being to feed said channels 32, the distribution blocks 62 may be considered as feeding distribution blocks 62*b*. They are placed upon the widening blocks 50 along the edges of said blocks thus leaving an unoccupied surface above the center of each of the widening blocks 50, and have the form of arches. This particular arrangement of the distribution blocks 62*b* combined with their shape ensures that gas will flow through the arches to the free region and will then be distributed to the inner channels of the checker bricks arranged above the widening blocks 50. Arranging distribution blocks on top of widening blocks thus allows the use of full columns and less complex widening blocks 50 which are easier to manufacture, and increases the solidity of the support assembly 16.

Figure 12:
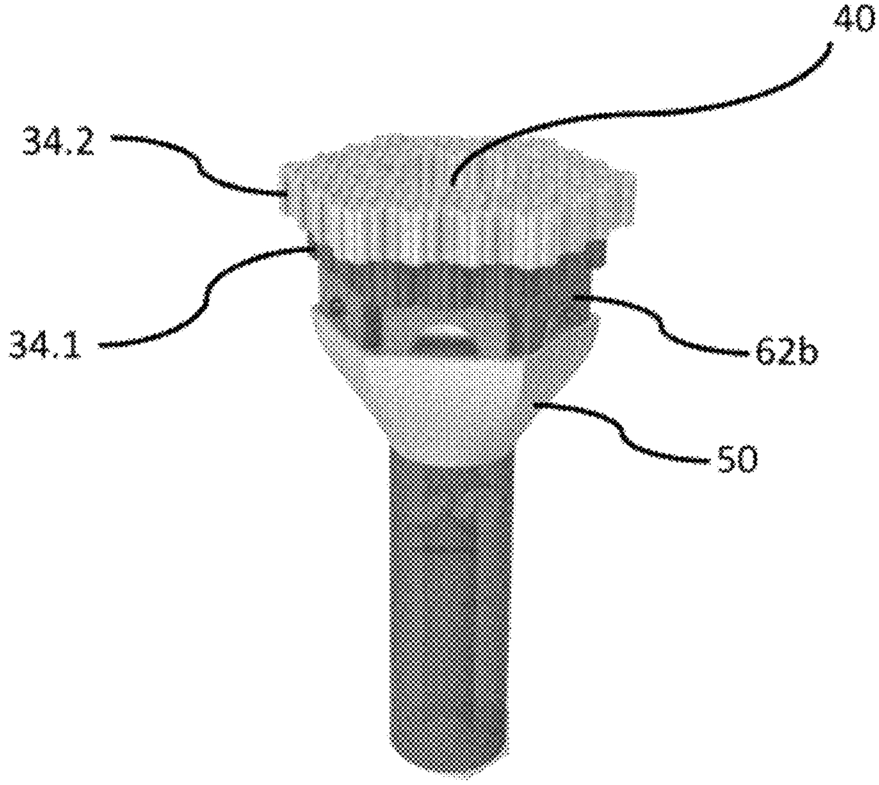
FIG. 12 is an enlargement of the sixth preferred embodiment of the inventive support assembly of FIG. 11.

The carrier floor in the illustrated example of FIG. 11 comprises, further to a widening structure 30 made of widening blocks 32 and a distribution floor made of distribution blocks 62, four rows 34.*i* of checker bricks 12 positioned in a staggered arrangement to gradually extend the upper surface of the distribution blocks, and thus the upper surface of the support columns 20*a*, to cover a surface corresponding to the whole surface of the checkerwork 14. Rows 34.1 to 34.4 of checker bricks 12 are arranged so as to form a distribution chamber 40 (FIG. 12) above support columns 20*a* to further optimize the gas flow distribution inside the channels of the checker bricks forming the checkerwork 14.

Figure 13:
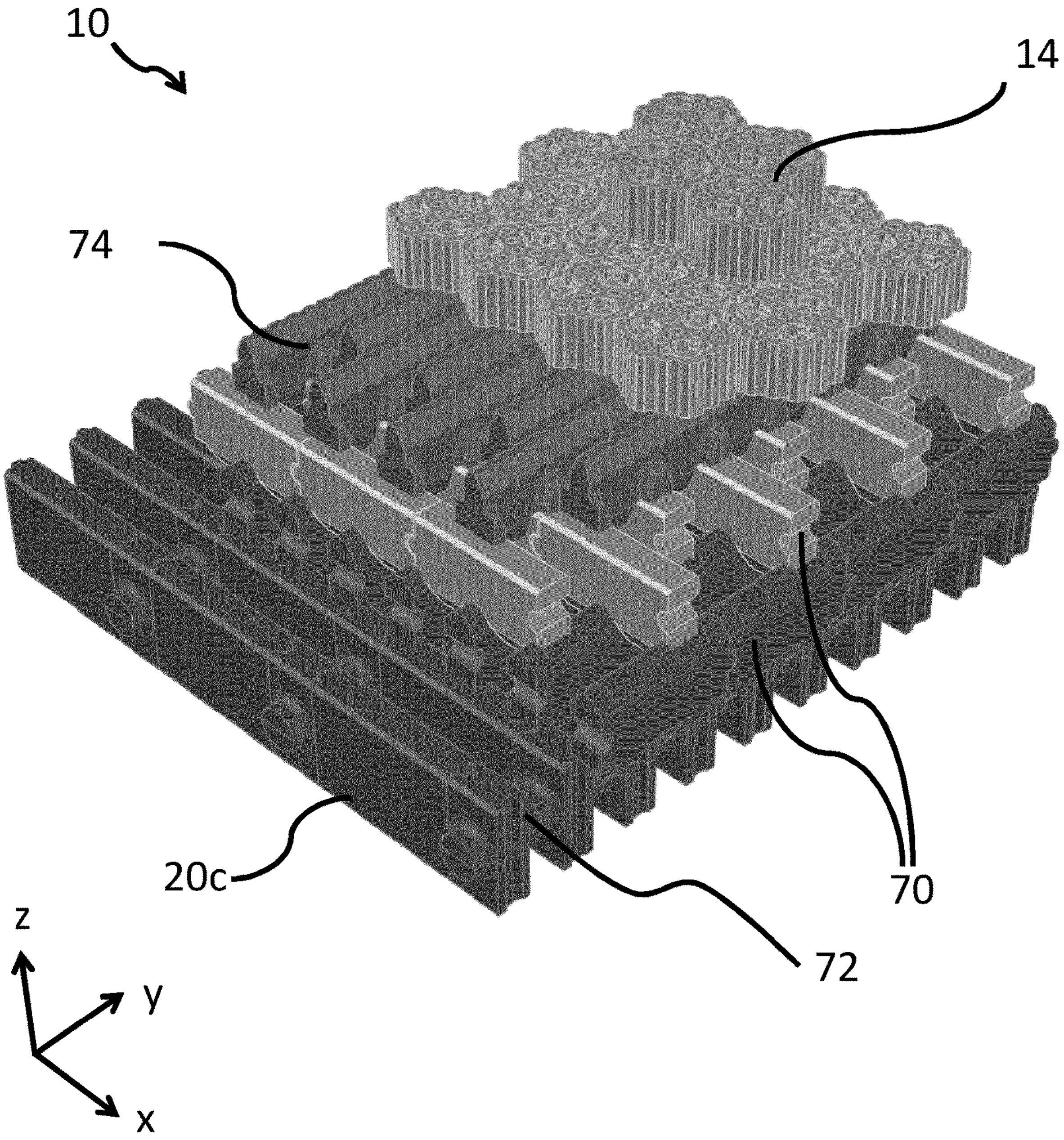
FIG. 13 is a schematic view of a seventh preferred embodiment of the inventive support assembly.
Figure 14:
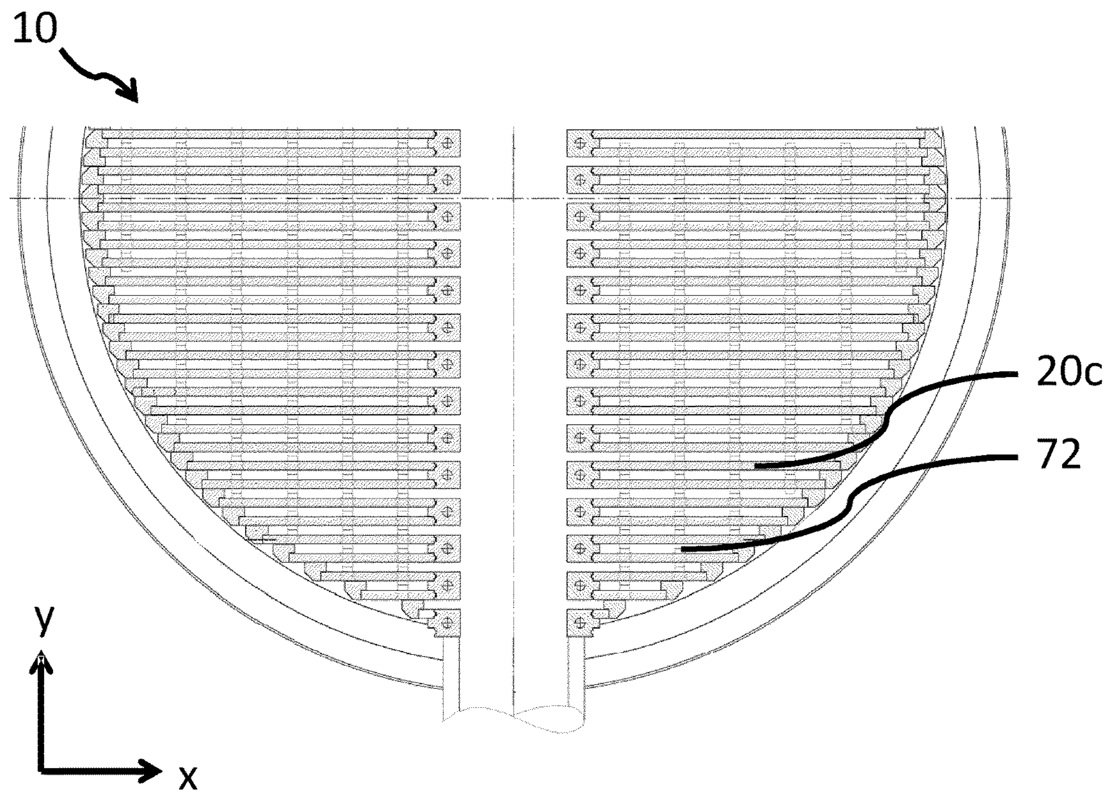
FIG. 14 is a schematic view of the seventh embodiment of FIG. 13 along a x-y plan.

Yet, another preferred embodiment of the support assembly according to the disclosure is presented on FIG. 13 to FIG. 16. The carrier structure comprises a plurality of support walls 20*c* disposed adjacent to one another so as to form rows. The rows are parallel to one another and may be connected by means of connecting cylinders 72, e.g. to enhance stability of the carrier structure. Connecting cylinders may be replaced by rectangular connecting bricks (not shown). The carrier structure may comprise several layers of such rows, arranged in a rectangular (as shown in FIG. 13) or hexagonal manner, thereby forming a grid of support walls. The carrier structure further comprises a plurality of transition bricks 70, which may be arranged in multiple layers, e.g. two layers as shown on FIG. 13. Transition bricks 70 of the lowermost layer are disposed so as to span between two or more parallel support walls 20*c*. The transition bricks 70 may be provided to reinforce the carrier floor supporting the checkerwork 14.

In the present embodiment of FIG. 13 to FIG. 16, the carrier floor is made of a plurality of bricks 74. The bricks 74 of the carrier floor may present a cross-section narrowing in the direction of the checker bricks and grooves on their outer surface to ensure and/or improve the gas flow distribution in the channels of the checker bricks forming the checkerwork.

The support walls 20*c* and/or the transition bricks 70 may be identical or similar to the burner bricks and support structure used in a burner of a metallurgical furnace. Existing bricks and/or walls may be reused to avoid unnecessary production costs or to avoid having to manufacture complex refractory shapes.

Figure 15:
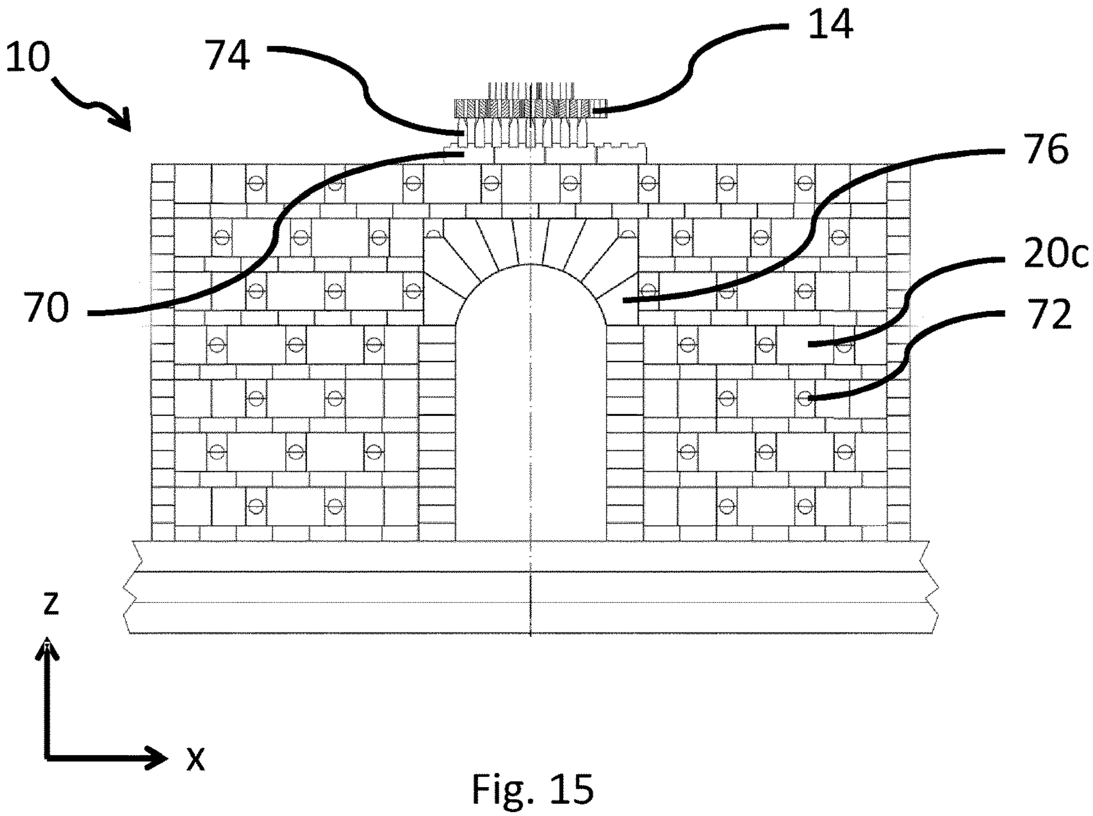
FIG. 15 is a schematic view of the seventh embodiment of FIG. 13 along a x-z plan.

As one can see on FIG. 15, it is also possible to combine support walls 20*c* with arches 76 to form the carrier structure, which may ensure a better gas distribution and/or create pathways for operators during maintenance. In some embodiments, support arches 20*b* may be used as arches 76, but it is not mandatory.

Figure 16:
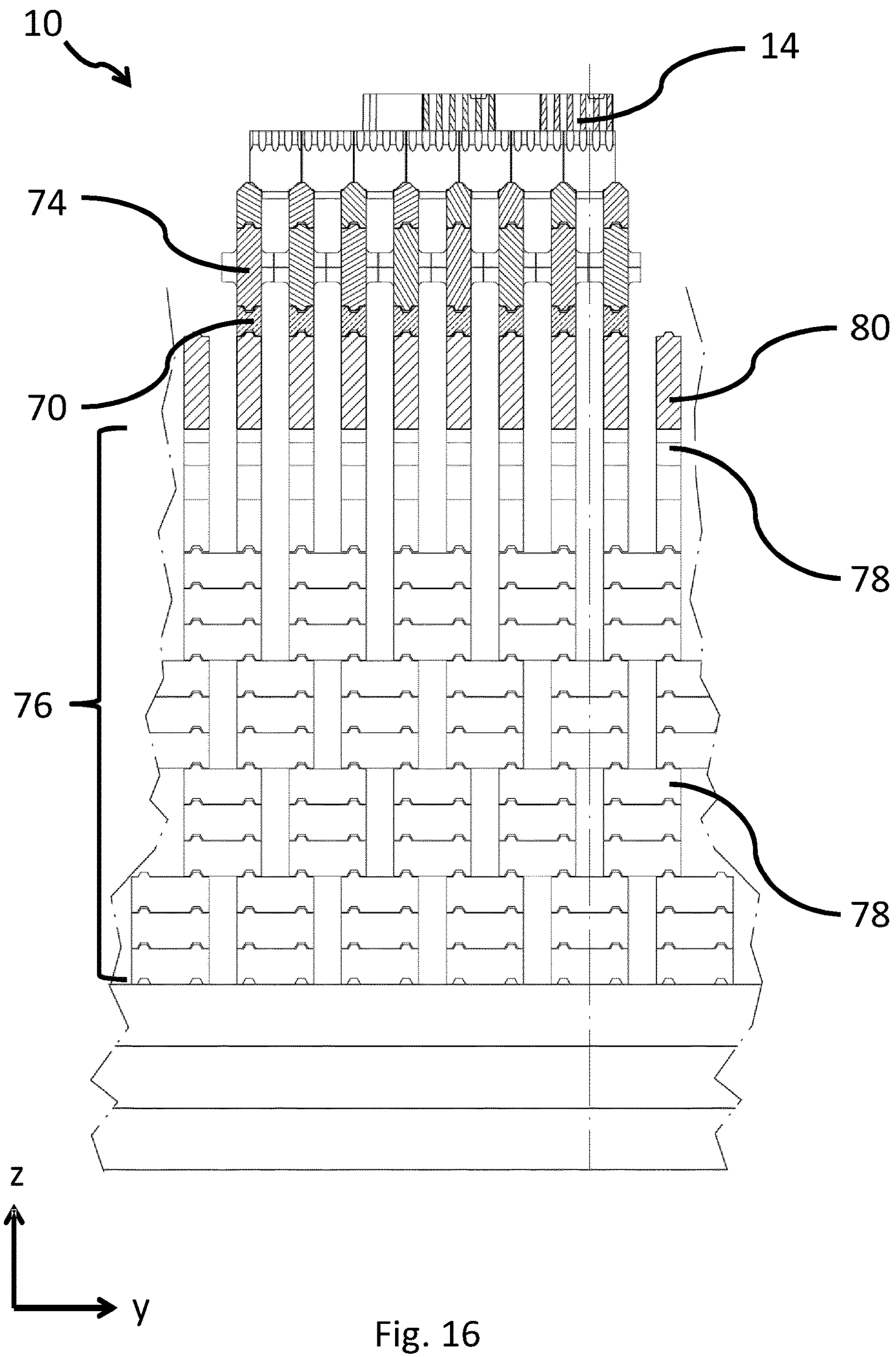
FIG. 16 is a schematic view of the seventh embodiment of FIG. 13 along a y-z plan.

The arches 76 may be made by a plurality of arch sections 78 as shown in FIG. 16, and bricks 80 forming the support walls 20*c* may be arranged on top of the arches 76 so as to extend the support wall 20*c* above the arch 76 to support the transition bricks 70 (see FIG. 16).

It should be noted that the above embodiments are purely for illustrative purposes. The indicated numbers, sizes and shapes may easily be revised by the skilled person to adapt the support structure to the particular design and operating conditions of the stove in question.

The invention claimed is:

1. A heat storage device, comprising:
- a support assembly; and
- a heat regeneration checkerwork made of checker bricks, said heat regeneration checkerwork being supported by said support assembly,
- wherein said support assembly comprises:
  - a carrier structure made of refractory material; comprising a plurality of support columns, wherein said support columns are hollow columns and present at least one through-opening along a radial direction of said support columns for gas to flow through; and
  - a carrier floor made of refractory material, said carrier floor resting on said carrier structure and being arranged and formed to carry the checker bricks of the checkerwork, wherein the carrier floor comprises a plurality of distribution blocks having at least three lateral surfaces and wherein the distribution blocks comprise at least one inner channel embedded therewithin, and wherein the at least three lateral surfaces comprise at least one circular groove, the at least one groove presenting a curvature radius equals to a curvature radius of said at least one inner channel;
  - wherein said support assembly does not comprise any metal support or metal carrier elements.

2. The heat storage device according to claim 1, wherein said refractory material is ceramic refractory material.

3. The heat storage device according to claim 1, wherein the carrier floor is arranged and formed to extend an upper surface area of the carrier structure to cover the whole surface area of the checkerwork.

4. The heat storage device according to claim 1, wherein said at least one through-opening of the support columns is a circular through-opening or an oblong through-opening.

5. The heat storage device according to claim 1, wherein the carrier structure further comprises a plurality of support arches.

6. The heat storage device according to claim 1, wherein the carrier structure further comprises a plurality of support walls and a plurality of transition bricks, each brick extending between at least two support walls.

7. The heat storage device according to claim 1, wherein the carrier floor comprises a plurality of rows of checker bricks, wherein successive rows of checker bricks are arranged in a staggered configuration, thereby gradually extending the upper surface area of the support columns to cover the whole surface area of the checkerwork.

8. The heat storage device according to claim 1, wherein the carrier floor comprises a widening block having two parallel surfaces and at least three other surfaces called lateral surfaces, and wherein a first parallel surface of said widening block defines a lower surface configured for resting on the carrier structure and a second parallel surface of said widening block defines an upper surface configured for supporting the checkerwork.

9. The heat storage device according to claim 8, wherein the widening block has the form of a hexagonal prism.

10. The heat storage device according to claim 8, wherein the widening block has the form of a truncated hexagonal pyramid and wherein the lower surface is the smaller of the two parallel surfaces.

11. The heat storage device according to claim 8, wherein the widening block comprises inner channels arranged in a repeating pattern, and wherein an outlet of said inner channels is positioned on the upper surface of the widening block.

12. The heat storage device according to claim 11, wherein the inner channels of the widening block have the same diameter than the channels of the checker bricks and whose outlet are positioned on the upper surface of the widening block to be in alignment with said channels of the checker bricks.

13. The heat storage device according to claim 8, wherein the widening block further comprises a central channel having on the lower surface a cross section corresponding to the inner cross section of the support columns.

14. The heat storage device according to claim 13, wherein the cross section of the central channel of the widening block widens in direction of the upper surface.

15. The heat storage device according to claim 8, wherein each of the at least three lateral surfaces of the widening block comprises at least one groove.

16. The heat storage device according to claim 15, wherein the at least one groove is a circular groove and presents a curvature radius equal to a curvature radius of the inner channels.

17. The heat storage device according to claim 15, wherein the at least one groove is a circular groove and presents a curvature radius equal to a curvature radius of the central channel.

18. The heat storage device according to claim 8, wherein the widening block is formed by a plurality of block sections.

19. The heat storage device according to claim 8, wherein the widening block is dimensioned such that a single row of widening blocks extends the upper surface area of the support columns to cover the whole surface area of the checkerwork.

20. The heat storage device according to claim 19, wherein the carrier floor comprises a plurality of rows of widening blocks staggered in quincunx.

21. The heat storage device according to claim 8, wherein the widening block is dimensioned such that a single row of widening blocks extends the upper surface area of the support columns to partially cover the surface area of the checkerwork, and wherein the carrier floor further comprises one or more rows of checker bricks to cover the whole surface area of the checkerwork.

22. The heat storage device according to claim 1, wherein the distribution blocks forming the carrier floor have the form of a hexagonal prism, having two parallel surfaces and six lateral surfaces perpendicular to said parallel surfaces.

23. The heat storage device according to claim 22, wherein at least one of the distribution blocks further comprises at least one distribution chamber, said chamber forming an opening on one of the two parallel surfaces of the distribution block, the at least one distribution chamber being a half-sphere.

24. The heat storage device according to claim 23, wherein the opening formed by the at least one distribution chamber on one of the two parallel surfaces of the distribution block and the inner diameter of the support columns presents the same size, and are aligned.

25. The heat storage device according to claim 1, wherein the distribution blocks forming the distribution floor are arches.

26. The heat storage device according to claim 1, wherein the distribution blocks are placed upon a widening block or the support layer with the parallel wall arrangement.

27. The heat storage device according to claim 1, wherein the carrier floor comprises at least three rows of checker bricks, said checker bricks being arranged to form distribution chambers above the carrier structure, said distribution chambers being localized between the second and the penultimate rows of checker bricks of said carrier floor.

28. Method for heating blast air using a heat storage device according to claim 1 as a regenerative heat exchanger.

29. Method for heating syngas using a heat storage device according to claim 1 as a regenerative heat exchanger.

* * * * *